United States Patent [19]

Leonard

[11] Patent Number: 4,946,426
[45] Date of Patent: Aug. 7, 1990

[54] SELF-POSITIONING BELT TENSIONER

[75] Inventor: George H. Leonard, Darien, Conn.

[73] Assignee: Stern & Leonard Associates, Wilton, Conn.

[21] Appl. No.: 403,571

[22] Filed: Sep. 6, 1989

[51] Int. Cl.$^5$ .......................... F16H 7/08; F16H 55/54
[52] U.S. Cl. ........................................ 474/101; 474/49
[58] Field of Search .................... 474/49, 50, 52–56, 474/101, 111, 113–117, 136, 137, 140, 138

[56] References Cited

U.S. PATENT DOCUMENTS

| | | | |
|---|---|---|---|
| 4,030,373 | 6/1977 | Leonard | 474/49 X |
| 4,530,676 | 7/1985 | Leonard | 474/49 |
| 4,810,236 | 3/1989 | Kumm | 474/101 |
| 4,816,008 | 3/1989 | Leonard | 474/49 X |
| 4,820,244 | 4/1989 | Lander | 474/56 |
| 4,832,660 | 5/1989 | Leonard | 474/49 |

Primary Examiner—Thuy M. Bui
Attorney, Agent, or Firm—Perman & Green

[57] ABSTRACT

A self adjusting tensioning system for a variable transmission. An endless belt is advanced by and supported on a pair of spaced apart, variable diameter, sheaves which are independently movable between reduced and enlarged configurations and which result in the belt assuming different paths. A pair of rollers are rotatably mounted at fixedly spaced locations on an enlongated carrier member. One of the rollers is actively biased into engagement with the belt by a compression spring assembly. A cam surface on the carrier member proximate the other of the rollers is slidable along a fixed contoured supporting surface and passively assures engagement of the other of the rollers with the belt. As the ratio of the transmission changes with changed diameters of the sheaves and the belt thereby assumes a changed path, the belt is effective to automatically move the rollers therealong so as to maintain a substantially constant tension in the belt.

16 Claims, 8 Drawing Sheets

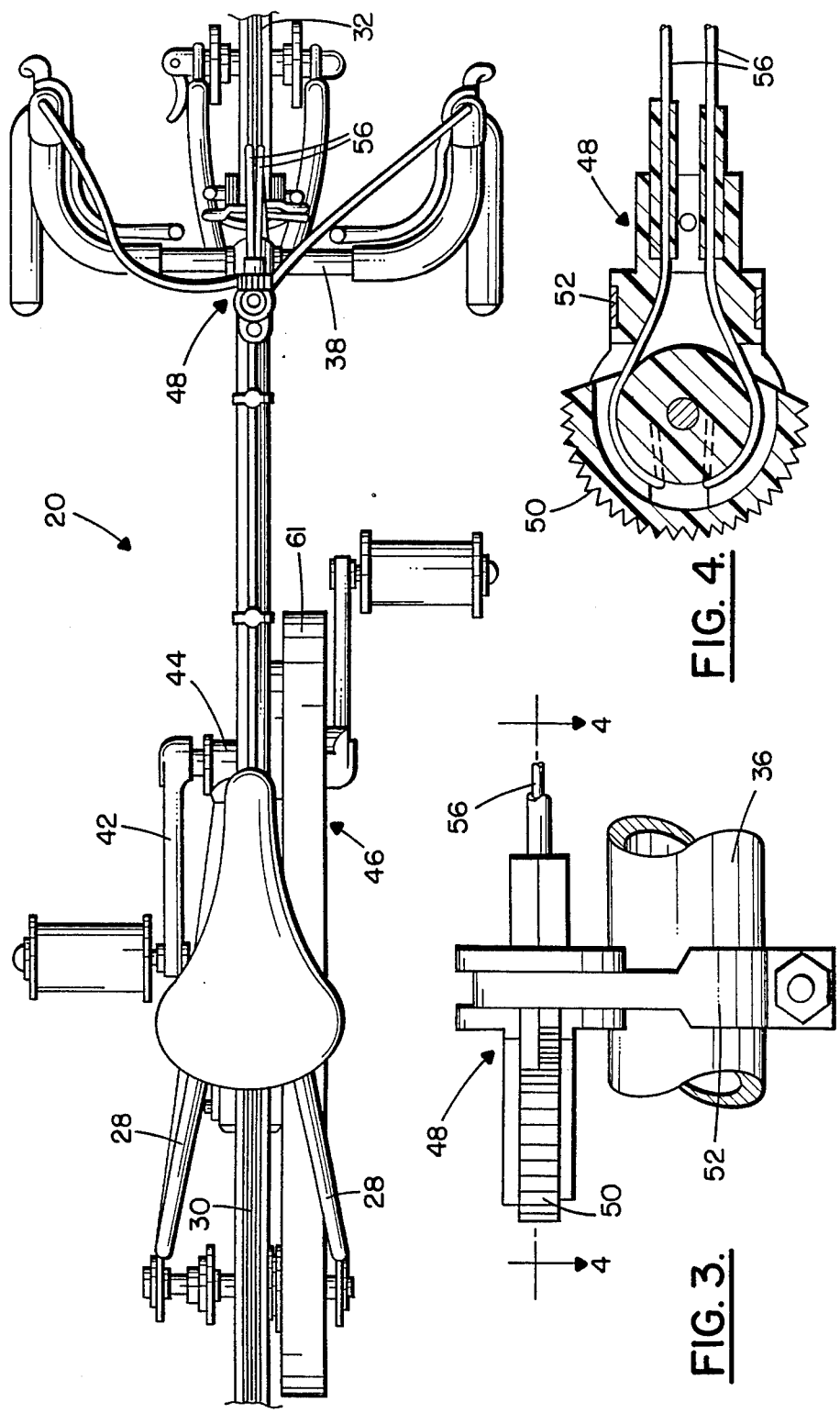

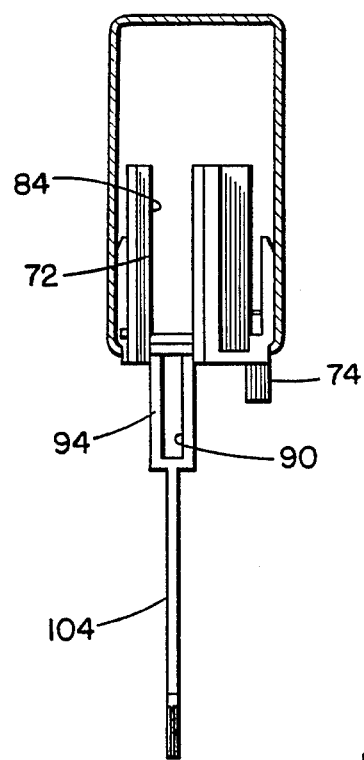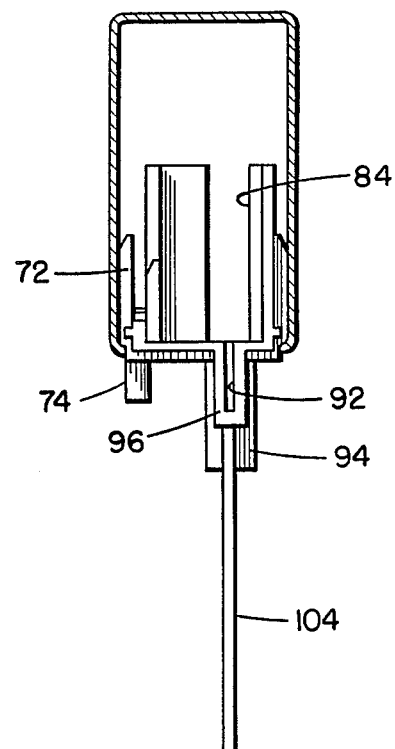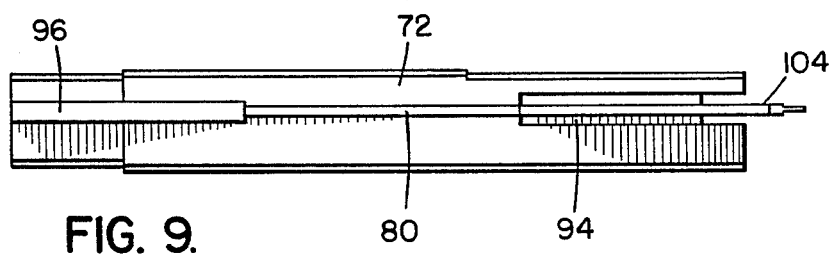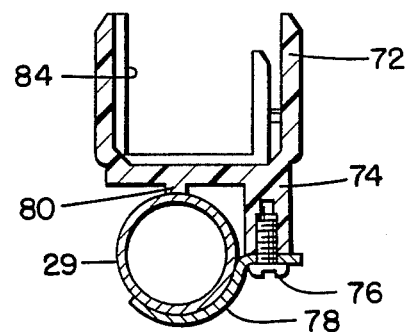

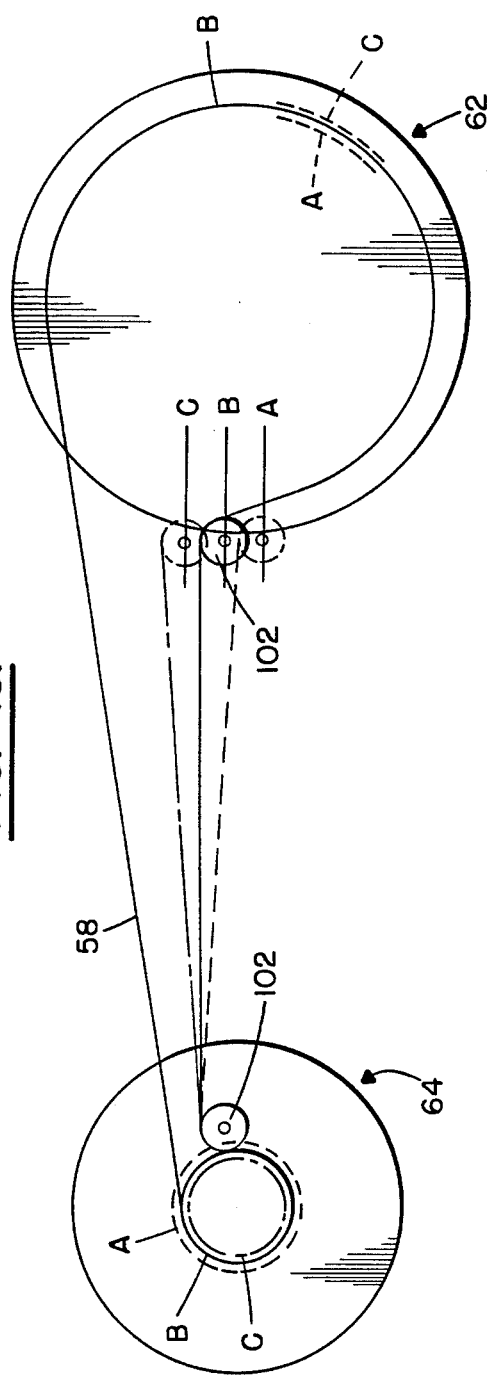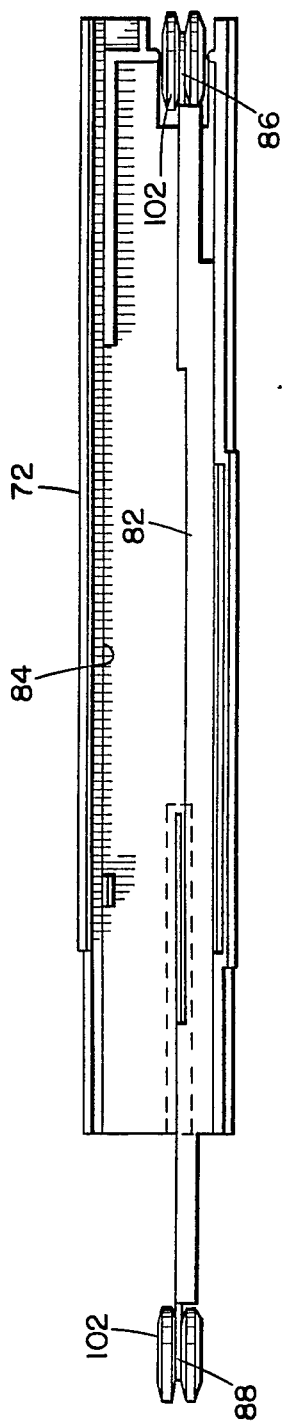

SELF-POSITIONING BELT TENSIONER

BACKGROUND OF THE INVENTION a. Related Application

Reference is hereby made to my copending application filed on the same date as the present application, Ser. No. 403,657, entitled "Spring Assembly" which is fully incorporated herein.

b. Field of the Invention

The present invention relates to variable ratio transmissions or drive systems generally utilizing a drive belt and, more particularly, to a mechanism for maintaining a substantially, constant, though minimized, tension on the drive belt. The invention has particular application to bicycles and is generally related in this context in the present disclosure. Nonetheless, such presentation must be understood as being exemplary of the invention and not limiting, since its principles may be applied in a host of other environments.

c. Description of the Prior Art

Bicycles equipped with chain-driven multi-speed transmissions called "derailleurs" have become popular world-wide. Derailleurs enable the bicycle rider to select various "speeds" for various slopes of the road and to accommodate the different needs of vigorous and weaker riders. A selected "speed" of a bicycle transmission identifies the ratio of the number of turns of the pedal crank to the resulting number of turns of the driven rear wheel.

A vigorous rider will choose a high speed or transmission ratio for riding down-hill or along a level road so that pedaling at a reasonable rate causes the bicycle to travel rapidly, and the same rider will choose a different ratio, a low speed, when riding slowly up-hill or on a poor road such as gravel.

Derailleurs with ten speeds are most common. However, derailleurs having more than ten speeds have become more and more common because they provide additional choices between the speeds of the ten speed transmission but have significant drawbacks including increased cost, weight and troublesome complexity.

A derailleur is inherently heavy due to its chain and many gears which are of metal, whereas bicycle riders have a high regard for lightweight bicycles. Also, derailleurs lack an indicator to tell the rider which speed or ratio has been selected. Furthermore, most derailleurs lack a housing so that the mechanism is exposed to rain, abrasive dirt, and other contaminants, leading to rust, wear and other damage. Finally, when a bicycle is equipped with a derailleur, it is difficult and cumbersome to remove and reassemble the rear wheel of the bicycle for replacing or repairing the tire. It is equally difficult to remove the whole transmission for replacement.

An alternative type of variable ratio transmission for bicycles is disclosed in U.S. Pat. Nos. 4,030,373 and 4,530,676 in which I am the inventor. Both of these patents are incorporated herein by reference. That type of transmission includes a pair of adjustable sheaves coupled to each other by a belt. The present invention involves a novel transmission of that type.

In U.S. Pat. No. 4,030,373, a set of sheave segments are continuously adjustable radially on each of the two sheaves, so that fine locking teeth are required to maintain any adjustment. In the transmission in U.S. Pat. No. 4,530,676, each of the sheaves also has a set of sheave segments that are adjustable. As an improvement over the '373 patent, the adjustments in '676 differ by discrete increments. A large number of discrete transmission ratios can be provided and relatively large locking teeth are used which are capable of withstanding much greater forces imposed on the sheave segments by the belt than in the '373 patent. Either of the sheaves in '676 can be used as the driving sheave in general applications of the transmission.

In any such transmission utilizing a belt, a continuous goal of the design is to maintain a substantially constant, albeit minimal, tension in the belt. Excessive tension occurring in the belt, even momentary as during shifting of the drive ratios, should be avoided. Various attempts have been made by me in seeking this goal. In the '373 patent, for example, I disclosed a construction in which the belt engages a pair of spaced idlers, one being fixed and the other being movable and biased against the belt. In the '676 patent, a somewhat different construction is disclosed in which a spaced pair of guide rollers are rotatably mounted on the respective ends of resilient arms. The guide rollers engage the drive belt and the resilient arms are free to pivot in the plane of the drive belt about an axis perpendicular to the plane of the drive belt.

A further transmission development of mine is presented in U.S. Pat. No. 4,816,008 and in its offspring, application Ser. No. 140,232, now U.S. Pat. No. 4,1816,008. Among the unique concepts disclosed in these disclosures is a belt tensioner according to which a pair of independently mounted and movable guide rollers are employed to engage the drive belt. These disclosures are also incorporated herein by reference.

Commonly assigned U.S. Pat. Nos. 4,820,244 and 4,832,660 disclose even further transmission developments, particularly relating to the construction of the sheaves which enable a variable ratio output, and are also incorporated herein by reference.

The present invention may be used in combination with the novel, improved transmission of the type mentioned above that includes two sheaves coupled to each other by a drive belt. In its broad aspect, the novel transmission is useful for widely varied purposes but certain attributes and added features render the transmission particularly useful in bicycles. In certain aspects of the invention, the novel transmission is an integral part of a bicycle.

The variable ratio drive mechanism has a drive sheave mechanism, a driven sheave mechanism, and an endless member or drive belt which drivingly couples the sheave mechanisms to each other. At least one of the sheave mechanisms includes a set of sheave segments, each sheave segment having a bearing surface engageable by the drive belt and means for placing and securing the sheave segments to said one sheave mechanisms in any of a series of positions distributed on said one sheave mechanism so that the bearing surfaces can be selectively positioned at a series of concentric circles. The drive belt applies pressure to all of the sheave segments except those in an adjustment zone of said one sheave mechanism where the drive belt is disengaged from the sheave segments. There is also provided gate means in the adjustment zone of said one sheave mechanism for adjusting the sheave segments to a selected position.

The gate adjustment means of the mechanism may have a control means and actuating means and the drive means to operate the mechanism may be in the same means to effect displacement of the gate to discrete positions. The mechanism may have two drive belt positioning means, one of which can be a force or tension applying means, adjacent the sheave mechanism for positioning the endless member to maintain wrap, and in some instances maximum wrap, of the endless member around the sheave mechanism, the drive belt positioning means being independently supported for movement. The mechanism may have locking rail means adjacent the sheave segments which are operated between released and locked conditions to adjust the positions of the sheave segments. The mechanism may also have a one-way clutch between the driven sheave means and the output thereof, such as the rear wheel of a bicycle, to provide easy decoupling of the output from the driven sheave means. The mechanism, which is easily and quickly removable from its frame such as a bicycle frame for replacement, intact, may also be made in a modular manner to be adaptable to frames of varying sizes.

It is eminently practical to provide a great many speeds, 21 speeds being provided in the example described in U.S. Pat. No. 4,816,008 in detail as compared to 10 speeds of a widely used derailleur. Molded plastic parts may be used almost exclusively so that the cost and weight of the transmission are comparatively low. The entire mechanism is designed such that it can readily be enclosed in a housing for protection against rain, dirt and other contaminants. This is in contrast to derailleurs wherein it is impractical to provide a housing and where exposure of the mechanism leads to rusting and premature wear of its parts.

The novel transmission can be equipped with an indicator to show the rider (or the user, in other applications of the transmission) which transmission ratio has been selected. In contrast, it is impractical to provide a unitary speed indicator in usual derailleurs.

In a bicycle equipped with the novel transmission with which the invention is utilized, the removal and reassembly of the rear wheel for repairing or replacing its tire is a simple matter. A one-way driving clutch between the ratio-changing mechanism and the rear wheel includes a driving clutch unit fixed to the belt driven sheave and a driven clutch unit fixed to the bicycle's rear wheel. The driven clutch unit and the rear wheel form an assembly that is removable from the bicycle as one part. When the rear wheel is removed, the driven clutch unit simple separates harmlessly from the driving clutch unit. The driving and driven units of the clutch become coupled to each other automatically when the rear wheel is reassembled to the bicycle. This is in contrast to a much more complicated procedure for removing the rear wheel of bicycles equipped with derailleurs.

In general applications of the transmission, either sheave can be used as the driving sheave. Moreover, the direction of rotation of the driving sheave can be reversed for special purposes when only a small amount of torque is required. When a bicycle is equipped with the novel transmission, its useful torque, when operated in reverse, enables the rider to change the transmission ratio by pedalling forward or backward, for example while coasting on a level road toward an uphill slope.

In transmissions having two belt-coupled sheaves, the belt includes a driving length that extends from one sheave to the other; the belt is wrapped part way around each sheave; and a return length of the belt completes the loop. Up to now, however, it has been difficult to assure that undesirable slack of the return length, or course, of the belt is taken up and that tension in the belt is maintained substantially constant throughout the shifting process.

It was in light of the foregoing that the present invention has been conceived and is now reduced to practice.

SUMMARY OF THE INVENTION

Accordingly, the present invention is directed toward a self-adjusting tensioning system for a variable transmission. To this end, an endless drive belt is advanced by and supported on a pair of spaced apart, variable diameter, sheaves which are independently movable between reduced and enlarged configurations and which result in the belt assuming different paths A pair of rollers are rotatably mounted at fixedly spaced locations on an elongated carrier member. One of the rollers is actively biased into engagement with the drive belt by a compression spring assembly. A cam surface on the carrier member proximate the other of the rollers is slidable along a fixed supporting surface and passively assures engagement of the other of the rollers with the drive belt. As the ratio of the transmission changes with changed diameters of the sheaves and the drive belt thereby assumes a changed path, the drive belt is effective to automatically move the rollers therealong so as to maintain a substantially constant tension in the drive belt.

The present invention is of extremely simplified design, for the most part utilizes extremely strong, yet lightweight materials, most notably, plastics, and is easily assembled and maintained.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 2 is a top plan view of the bicycle of FIG. 1 drawn to larger scale, portions of the wheels being broken away;

FIG. 3 is a side elevation view of a finger control shown in FIGS. 1 and 2, FIG. 3 being greatly enlarged as compared to FIGS. 1 and 2;

FIG. 4 is a cross-section of the finger control of FIG. 3 taken generally along line 4—4 in FIG. 3;

FIG. 9 is a cross section view taken generally along line 9—9 in FIG. 7.

FIG. 10 is a top plan view of certain components illustrated in FIGS. 6, 7, and 8;

FIG. 12 is a bottom plan view of the casing illustrated in FIG. 11;

FIGS. 14 and 15 are end elevation views taken from opposite ends, respectively, of the casing illustrated in FIGS. 11-13;

FIG. 16 is a diagrammatic side elevation view of the transmission into which the invention has been incorporated, for purposes of explanation of the operation of the invention.

DETAILED DESCRIPTION OF THE PREFERRED EMBODIMENTS

Figure 1:
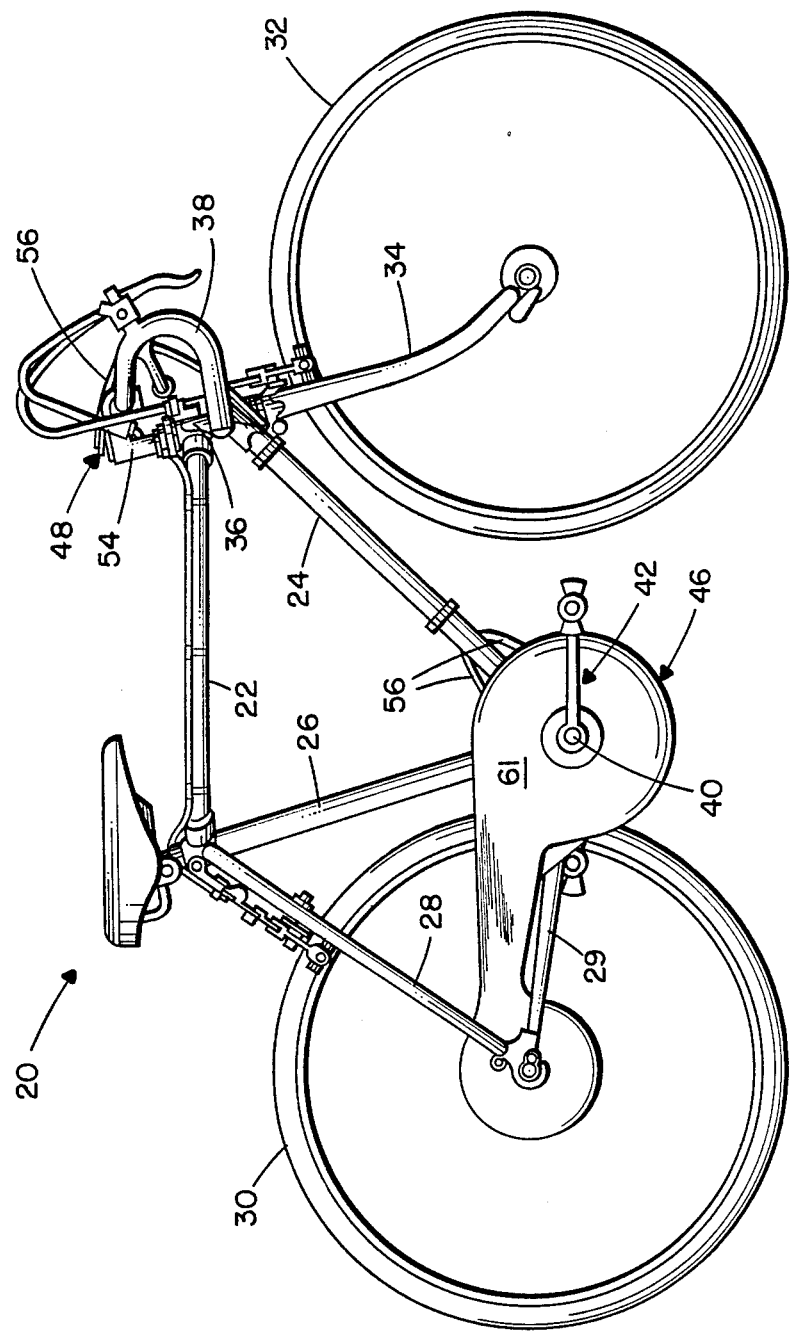
FIG. 1 is a right-side elevation of a bicycle equipped with a transmission utilizing a novel self adjusting drive belt tensioning system as an illustrative embodiment of the invention in its various aspects.

Refer now to the drawings, and initially to FIG. 1, which depict a bicycle 20 modified to incorporate a transmission utilizing the novel compensating mechanism of the invention. The bicycle is shown in FIG. 1 as it is seen from its right-hand side (the right-hand side of the bicycle rider).

The bicycle 20 may include a frame having a horizontal top tube 22, down tube 24 and seat tube 26 united as a triangle, plus two pairs of rear-wheel supports, one on each side of rear wheel 30 (FIGS. 1 and 2), one pair being upright supports 28, the other pair being horizontal supports 29. The front wheel 32 is supported in a fork 34 that turns in head tube 36 which interconnects tubes 22 and 24. Handle bar 38 (FIGS. 1 and 2) operates the fork. Shaft 40 of a pedal crank 42 has a bearing 44 (FIG. 2) at the junction of down tube 24 and seat tube 26.

An adjustable ratio transmission unit or drive mechanism 46 provides the drive coupling between pedal crank 42 and rear wheel 30. A manual transmission ratio control 48 (see FIGS. 2, 3, and 4) includes a pivoted finger-actuated member 50 that is conveniently operable by the person riding the bicycle. A detailed description of this mechanism is presented in U.S. Pat. No. 4,816,008 referred to previously. Bracket 52 secures manual control 48 to a stem 54 upstanding from the head tube 36. The control also includes a pair of sheathed cables 56 operated by and extending to the transmission unit 46.

When the finger-actuated member 50 of the control 48 is centered (see FIG. 4), the last-established ratio remains in effect. Shifting the member 50 one way or the other has the effect of conditioning the transmission to change its own ratio in progressive steps using effort provided by the pedal crank. So long as the member 50 remains off center, continued operation of the pedals will cause, within the design limits, continuing step-by-step change in the transmission's ratio.

Figure 5:
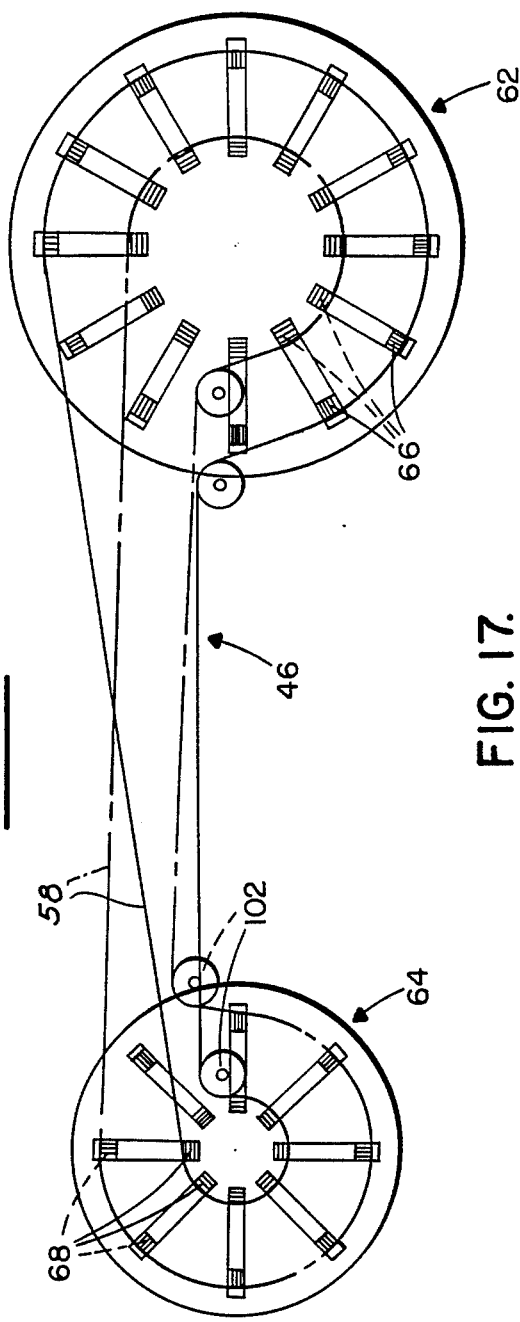
FIG. 5 is a side elevation view of a schematic representation of a transmission into which the self-adjusting belt tensioning system of the invention has been incorporated and illustrating two extreme configurations of the transmission.

FIG. 5 depicts, schematically, the transmission 46 and most notably an drive belt 58 therefor in its lowest speed configuration by means of solid lines and in its highest speed configuration by means of dash-dot lines. The transmission 46 is supported in a housing 60 which may be sealed with the aid of a cover 61 against contaminants and constructed from modular parts to enable its use with virtually all signs of commercially available bicycles.

Figure 6:
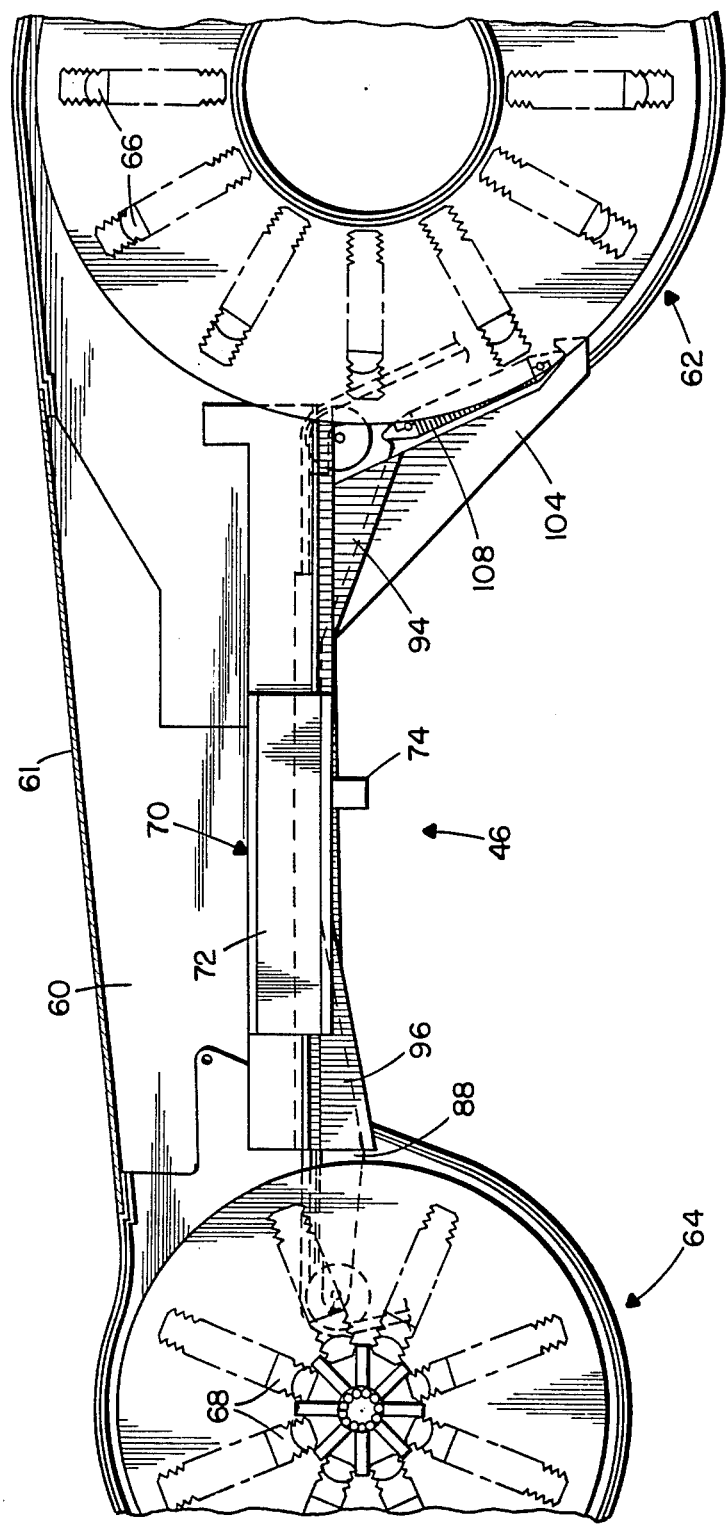
FIG. 6 is an enlarged detail side elevation view, certain parts being cut away, illustrating portions of a transmission incorporating the self adjusting drive belt tensioning system of the invention.

Viewing especially FIGS. 5 and 6, transmission 46 includes an adjustable front sheave mechanism 62 that is coaxial with and operated by pedal crank 42, and it includes a rear sheave mechanism 64 that operates the rear wheel. Sheave mechanism 62 includes a series of radially adjustable sheave segments 66 and sheave mechanism 64 includes a series of radially adjustable sheave segments 68. The endless drive belt 58 is in driving or driven frictional contact with the sheave segments of both sheave mechanisms 62 and 64 nearly all the way around each set of sheave segments When a selected transmission ratio is in effect, sheave segments 66 are locked at one common radius and sheave segments 68 are also locked at a common radius.

As with all of the materials of which the transmission 46 is fabricated, the drive belt 58 is composed of an extremely strong, light weight material. For example, the belt may be four-ribbed, J section, poly-vee belt composed of KEVLAR ® brand plastic material with neoprene or polyurethane traction member thereon. Previous materials used for transmission belts included glass or polyester which, unfortunately, do not have the combined characteristics of rigidity and strength which are necessary in an application such as a transmission.

When sheave segments 66 are at their minimum-radius positions and sheave segments 68 are at their maximum-radius positions as depicted by the dash-dot line drive belt 58 in FIG. 5, the transmission is in its lowest speed adjustment. This means that the rear wheel will turn least for each rotation of the pedal crank. Conversely, when sheave segments 66 are at their largest-radius adjustment and sheave segments are at their smallest-radius positions, as depicted by the solid line drive belt 58 in FIG. 5, the transmission is set for most rotation of the rear wheel for each rotation of the pedal crank. The sizes and relationships thereof in FIG. 5 are only illustrative and are of no particular scale.

A coordinating mechanism which is not part of the present disclosure, although such a mechanism is fully disclosed in U.S. Pat. No. 4,816,008, previously noted, is provided for determining the radial settings of both sets of adjustable sheave segments. Both the front or pedal-driven sheave mechanism 62 and the rear sheave mechanism 64 are adjusted progressively in opposite directions in going through successive steps of adjustment. The coordinating mechanism causes the radius of one sheave mechanism to increase one step and, at the same time, it causes the radius of the other sheave mechanism to decrease one step. In an alternative, it is possible for the front sheave mechanism and back sheave mechanisms to be adjusted alternatively (not concurrently) in response to successive steps of adjustment of the coordinating mechanism.

Throughout the adjustment process, it is necessary that slack in the drive belt 58 be taken up and that, while doing so, tension in the drive belt be maintained at a substantially constant value. This desirable goal is achieved by a unique compensator 70 as generally depicted in FIGS. 6-8, and 10. In this context, an elongated casing 72 (see also FIGS. 11-15) is mounted to the frame of the bicycle, specifically, on the horizontal run 29 of the rear wheel support. As seen especially well in FIGS. 7 and 9, the casing 72 is provided with a centrally disposed, downwardly extending boss 74 which is drilled and tapped to receive a mating screw 76 for fastening thereto a clamp 78. The clamp serves to hold a rib 80 extending longitudinally along the bottom of the casing 72 firmly against the frame of the bicycle and, specifically, against the horizontal rear wheel support 29. The casing 72 thus extends fore and aft generally along a lower course of the drive belt 58 (see especially FIG. 7).

Figure 8:
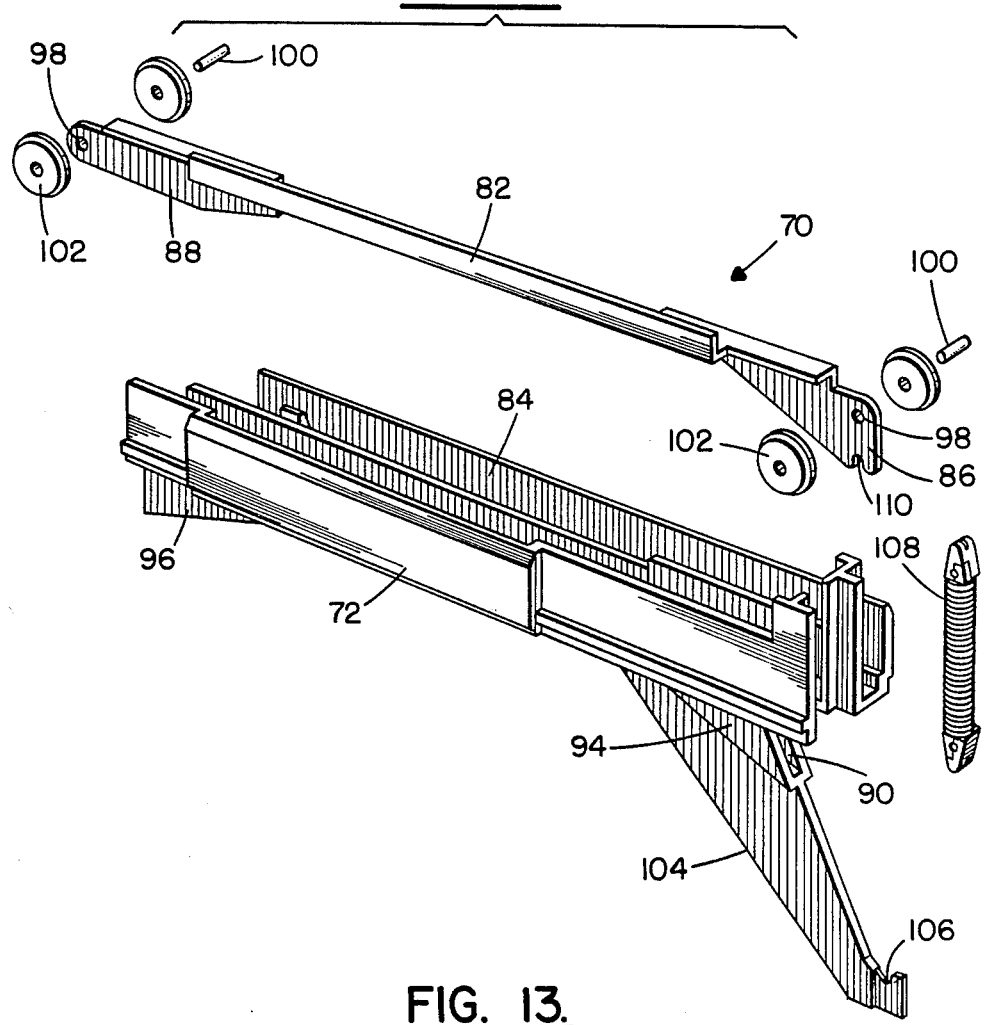
FIG. 8 is an exploded perspective view of the invention.
Figure 13:
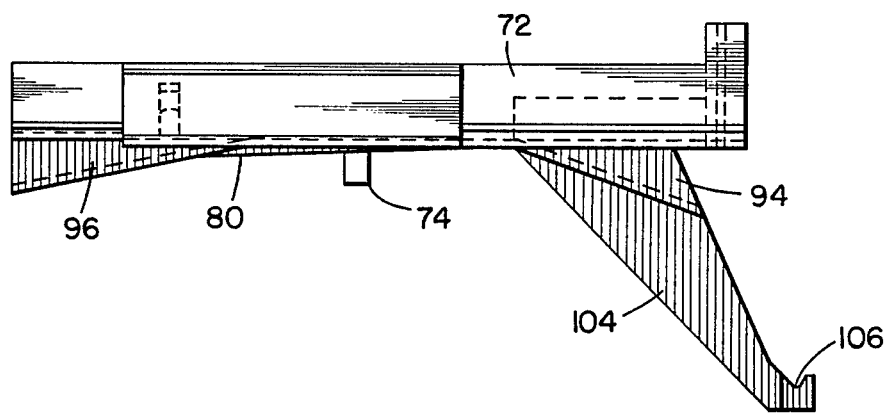
FIG. 13 is a side elevation view of the casing illustrated in FIGS. 11 and 12.

A carrier 82 is generally coextensive with the casing 72 and is movable fore and aft relative to the casing within a channel 84 defined by opposed parallel walls. More specifically, the carrier 82 is formed with fore and aft fins, 86 and 88, respectively, which are slidingly engaged with mating fore and aft slots 90, 92, respectively, formed in downwardly projecting extensions 94 and 96 of the casing 72. Thus, while the carrier 82 is freely movable in a fore and aft direction relative to the casing 72, it is substantially restrained laterally by means of the slots 90, 92. Each of the fins 86, 88 is provided with a transverse hole 98 to rotatably receive an axle pin 100. Rollers 102 are fixed to opposed ends of the axle pins so as to be positioned on opposite sides of the fins 86 and 88 (FIGS. 8 and 10).

The rollers 102 are engageable with a lower course of the drive belt 58 but, as yet, there has been no description of the manner in which the rollers are maintained in engagement with the drive belt and, further, assures that a substantially constant tension is maintained in the drive belt.

To this end, a downwardly extending leg 104 extends from the fore projection 94. A bearing notch 106 is formed at an extremity of the leg 104 and serves to receive one end of a compression spring assembly 108 which may be generally of the construction disclosed in application Ser. No. 403,657 to which reference has previously been made. The opposite end of the compression spring assembly 108 is matingly received within a bearing notch 110 formed in the fore fin 86 of the carrier 82.

Figure 7:
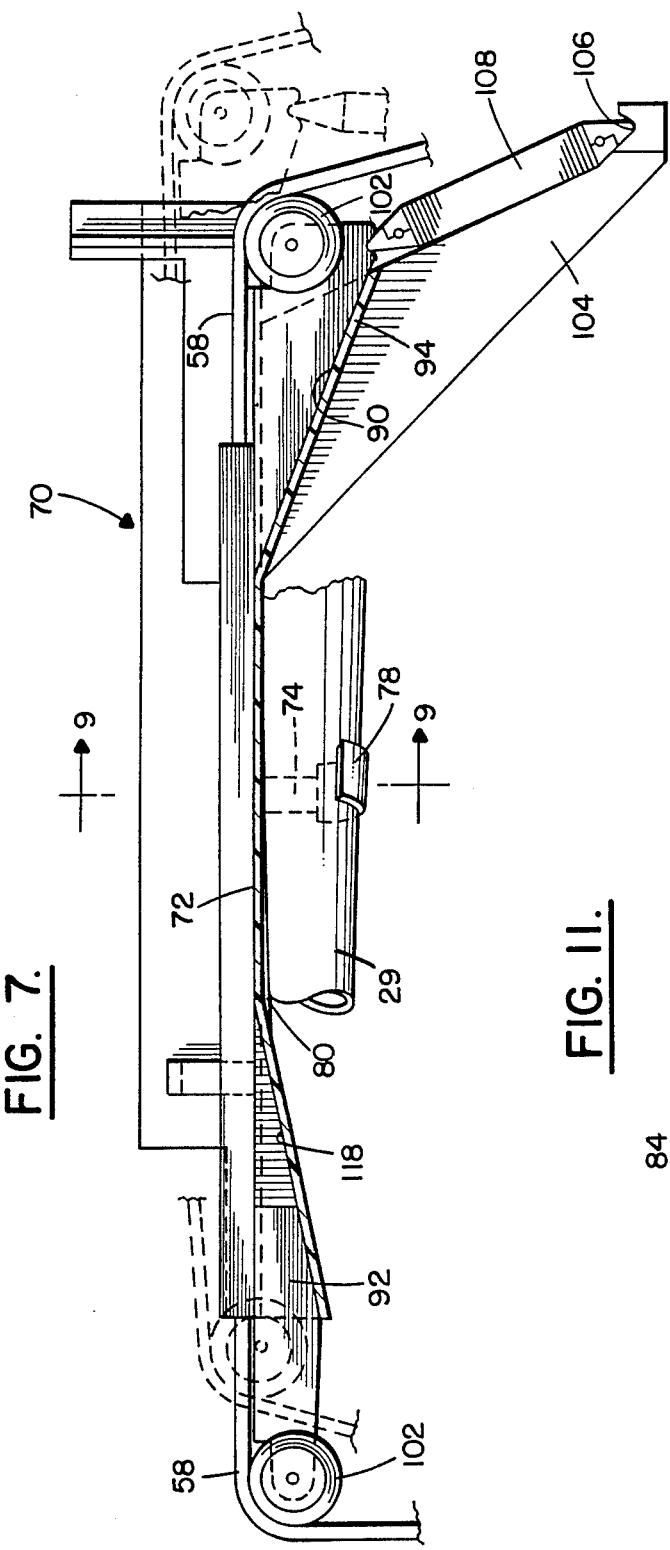
FIG. 7 is a detail side elevation view of the invention, certain components being cut away and shown in section for clarity.
Figure 7A:
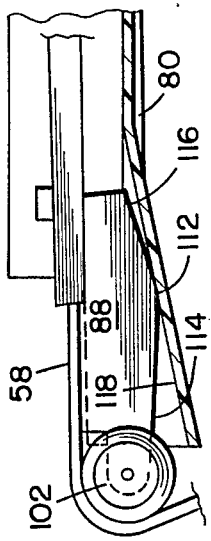
FIG. 7A is a detail side elevation view of a part of FIG. 7 illustrating another position of certain illustrated components.
Figure 11:
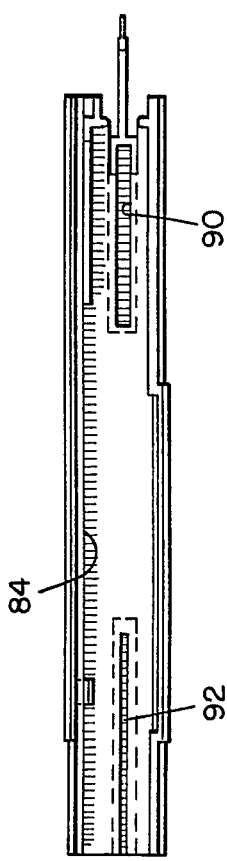
FIG. 11 is a top plan view of one component, namely the casing, illustrated in FIGS. 6, 7, and 8.

At an end of the compensator 70 distant from the compression spring assembly 108, the aft fin 88 of the carrier 82 is seen (see especially FIG. 7A) to have a well defined cam region 112 at the juncture of fin edges 114 and 116. Thus, as the carrier 82 moves toward the right from the position illustrated in FIG. 7 to that illustrated in FIG. 7A (also as illustrated in FIG. 7 by dashed lines), the cam region 112 is seen to engage and ride upon a cam surface 118 which is the bottom surface of the aft slot 92.

During this operation, then, the spring assembly 108 serves as an active bias on the rollers 102 at the forward end of the compensator 70 (to the right viewing FIG. 7) holding those rollers firmly in engagement with the drive belt 58. Such positive urging is not imparted to the rollers 102 at the aft end of the compensator 70, however. Rather, the tensioning of the drive belt 58 which occurs in the vicinity of the spring assembly 108 draws the drive belt into engagement with the rollers at the aft end of the carrier 82. By reason of the fact that the cam region 112 engages the cam surface 118, the rollers are passively caused to engage and remain in engagement with the drive belt.

The compensator 70 satisfies a number of potential problems inherent in belt drive mechanisms. For example, turning to FIG. 16, it will be recognized that a smaller diameter sheave mechanism, mechanism 64 as illustrated, shifts more rapidly than a larger sheave mechanism, mechanism 62 as illustrated. That is, during the shifting operation, the smaller sheave mechanism achieves its steady state condition faster or earlier than does the larger sheave mechanism. As the drive belt 58 moves from smaller orbit B to larger orbit A at the sheave mechanism 64, it oppositely moves from larger orbit B to smaller orbit A at the larger sheave mechanism 62. However, because of the time lapse of the actual shifting operation between the two sheave mechanisms, it will be appreciated that the sheave 62 does not "give up" a length of belt as fast as the sheave mechanism 64 is demanding it. This causes the rollers 102 adjacent the sheave mechanism 62 to momentarily (in mid-shift) assume another position such as that indicated at "A". When shifting has been completed and a steady state condition is again reached, the roller 102 adjacent the sheave mechanism 62 returns to position B. The letters "C" represent the opposite operation to that just described, namely, when the sheave mechanism 64 "gives up" belt faster than sheave mechanism 62 is able to receive it. In all of these instances, the compensator 70 is effective to instantaneously take up such slack in the drive belt as occurs and maintain a substantially constant tension in the belt.

Figure 17:
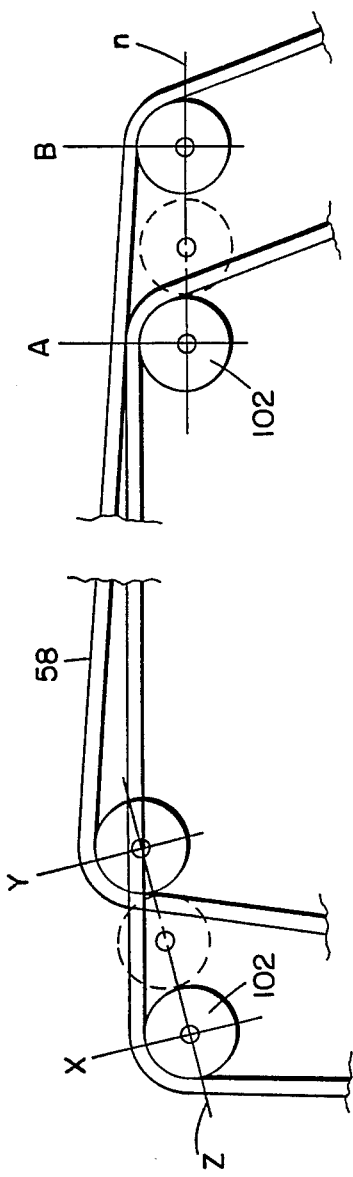
FIG. 17 is a detail diagrammatic side elevation view illustrating successive positions of the transmission drive belt and of the rollers which are part of the invention.

FIG. 17 depicts extreme positions of the fore and aft rollers 102, the former being indicated by the letter "X," the latter being indicated by the letter "Y", and an intermediate position being indicated by dashed lines for different ratios of the sheave mechanisms 62 and 64 during steady state or non shifting conditions. It is important to maintain the axes of the rollers 102 adjacent the spring assembly 108 in a plane n, (FIG. 17) for each ratio of the sheave mechanisms. This relationship assures that the spring assembly 108 will maintain substantially constant tension on the drive belt 58 at all times. By utilizing the cam surface 118 contoured according to a plane Z (FIG. 17) which is the locus of axes for the rollers 102 nearest the sheave mechanism 64 as they move between positions X and Y, the fore rollers 102 maintain a near planar positioning requiring only minimal length adjustments for the spring 108 and thereby resulting in a nearly uniform resulting force being imposed by the spring on the drive belt 58.

Another benefit achieved by reason of the sloping cam surface 118 is the ability of the transmission 46 to assume a lowest possible path regardless of the transmission ratios chosen while clearing the horizontal rear wheel support 29 by an acceptable amount. Furthermore, it assures maximum wrap of the drive melt 58 at both the front sheave mechanism 62 and at the rear sheave mechanism 64.

One other consideration in the design of the present transmission is reducing or eliminating slippage between the belt and sheave segments The movement, support and placement of compensator 70 in the transmission disclosed herein is of great importance in reaching this end. When force is applied to pedal crank 42 it will rotate sheave mechanism 62 along with sheave segments 66. Sheave segments 66, as they rotate, will place a force on belt 58 which transmits motion to sheave mechanism 64 through its segments 68. The amount of force that can be applied to the pedal crank without slippage of the belt relative to segments 66 can be expressed as a function of the tension forces applied to the belt on the "tight" and "slack" sides of sheave mechanism 62 by the pedal crank in accordance with the following formula:

$$T_2/T_1 = e^{fB}$$

wherein $T_2$ is the tension on the "tight" side of the belt (the upper belt run in FIG. 5 with forward pedalling); $T_1$ is the tension on the "slack" side of the belt (the lower belt in FIG. 5 with forward pedalling); e is the natural logarithm to the base e (log $T_2/T_1$); f is the coefficient of friction between the belt and sheave segments; and B is the total angle (in radians) of belt contact (or wrap) around the sheave segments. As can be seen from the above formula, the ratio of $T_2/T_1$ depends on the extent of belt wrap in a given system, and, further, since belt wrap B is an exponential factor in the formula and multiplied by the coefficient of friction f, small incremental increases in the extent of belt wrap will generate exceedingly large increases in the amount of force that can be placed on the pedal crank before slippage or impending slippage occurs.

It can be appreciated, in the environment of the transmission disclosed herein, that a sufficient degree of belt wrap to reduce undesirable slippage has to be accomplished in a very small space adjacent the periphery of the sheaves, a space that also contains several other elements of the overall system. Further, the positions of the compensator has to accommodate many ratios, such as the 21 discrete ratios in the transmission as described in U.S. Pat. No. 4,816,008. To accomplish this, compensator 70 is supported for movement to obtain the degree of wrap desired. The structure provided herein by reason of which the compensator 70 is supported and moved enables the belt to have a larger amount of contact or wrap with the sheave segments 66 and 68 than the prior art for all selected ratios. It does so while still providing sufficient room for the other parts of the mechanism.

While preferred embodiments of the invention have been disclosed in detail, it should be understood by those skilled in the art that various other modifications may be made to the illustrated embodiments without departing from the scope of the invention as described in the specification and defined in the appended claims. For example, while the invention has been disclosed in the context of a variable ratio transmission, it may also be advantageously applied to a conventional fixed ratio, fix center, belt transmission. In such an instance, the magnitude of the belt wraparound achieved by reason of the invention results in many of the previously mentioned advantages which accrued in the instance of the variable ratio transmission. Thus, a drive belt using the present invention can be used to achieve a greater output at less cost than any design previously known to me.

What is claimed is:

1. A self adjusting drive means tensioning system for a variable transmission comprising:
   frame means;
   a pair of spaced apart variable diameter sheaves mounted on said frame means;
   endless drive means wrapped at least partially around each said sheave for transmitting rotational force from one said sheave to the other; and
   tensioning means for said drive means including at least two spaced apart guides adjacent said drive means for placing force through said guides against said drive means whereby said guides maintain said drive means around said sheaves in optimum driving relationship for all diameters of said sheaves, said guides being supported by said frame means for movement in a non-rotational path as determined by the geometry of said drive means depending upon the diameters of said sheaves for any given ratio of the transmission whereby as the ratio of the transmission changes and said drive means achieves a new geometry in response to the changing diameters of said sheaves, said drive means automatically adjusts the position of said tensioning means.

2. A tensioning system as set forth in claim 1 wherein said support for said tensioning means is adjacent one of said guides, and, further including, bias means adjacent the other of said guides for biasing said other guide towards said drive means.

3. A method of tensioning an endless drive means of a variable ratio transmission system wherein said drive means at least partially wraps around two sheaves, the diameter of at least one sheave changing to effect a transmission ratio change, said drive means assuming different geometries for each selected transmission ratio, comprising the steps of:
   (a) supporting a tensioning means for the drive means for non-rotational movement, the tensioning means having at least two spaced apart guides adjacent said drive means for maintaining the drive means in a particular geometry for the ratio selected;
   (b) selecting a new ratio whereby the diameters of at least one of the sheaves is changed; and
   (c) repositioning the tensioning means along the path of non-rotational movement in response to the change in the sheave diameter for maintaining the drive means in a new geometry associated with the new ratio.

4. Method of tensioning as set forth in claim 3 wherein:
   step (c) is automatically carried out by the shifting of the drive means, the shifting of the drive means causing the drive means to apply force to the tensioning means to move it to support the drive means in the new geometry.

5. A method of tensioning as set forth in claim 3 including the step of biasing the tensioning means towards the drive means.

6. A tensioning system for an endless drive means supported for movement by and at least partially wrapped around at least two sheaves supported by a frame comprising:
   tensioning means including at least two spaced apart guide members for guiding the drive means;
   support means for said tensioning means on said frame which is closer to one of said guide members than said other guide member, and
   biasing means for biasing said tensioning means towards said drive means which applies a force on said tensioning means and said drive means, the point of application of said biasing force being closer to said other of said guide members than said one guide member.

7. A tensioning apparatus for applying a tensioning force on an endless drive means supported by sheaves mounted on a frame comprising:
   a rigid member;

at least two spaced apart guide members for guiding the drive means;

leg means on said rigid member closer to one of said guide members than the other said guide member for controlling movement of said rigid member; and a force application region located on said rigid member closer to said other guide member than said one guide member for maintaining said guide members against said drive means.

8. A tensioning system as set forth in claim 7 including bias means between said frame and said force application region of said rigid member.

9. A tensioning system as set forth in claim 7 wherein said guide members are rollers.

10. Compensating apparatus continuously engageable with an endless belt being advanced by and supported on a pair of spaced apart sheave means which guide the belt along opposed courses, the sheave means being independently movable between reduced and enlarged configurations to thereby alter the path of the belt, said compensating apparatus comprising:

first and second spaced apart guide members at fixed distances apart and engageable with one of the courses of the belt;

means biasing said first guide member into engagement with the belt; and means distant from said biasing means for freely supporting said second guide member to assure passive engagement of the belt by said second guide member;

said guide members being movable in unison along the belt in response to the path taken by the belt thereby maintaining substantially constant the tension in the belt regardless of the path assumed by the belt.

11. Compensating apparatus as set forth in claim 10 including:

stationary elongated casing means extending fore and aft generally along one of the courses of the belt;

carrier means generally coextensive with said casing means and movable fore and aft relative to said casing means and including means mounting said guide members thereon;

said biasing means including compression spring means extending between said casing means and said carrier means;

said supporting means including a supporting surface on said casing means distant from said biasing means;

said carrier means including a cam member engageable with said supporting surface and slidable along said supporting surface.

12. Compensating apparatus as set forth in claim 11 wherein said first and second guide members are rollers, said carrier means including means for rotatably mounting said rollers thereon.

13. Compensating apparatus as set forth in claim 12 wherein said casing means includes a leg member extending to an extremity distant from one of the courses of the belt;

said compression spring means extending between said extremity and said carrier means.

14. Compensating apparatus as set forth in claim 13 wherein said compression spring means includes:

a compression spring; and first and second oppositely disposed guide members for the captured reception thereon of said compression spring, each of said guide members including:

a head extending between a bearing surface and a shoulder; and elongated leg means integral with said head having outer surfaces and extending from said shoulder in a direction away from said bearing surface and terminating at tip ends, said guide members being mutually, matingly, slidably, engageable such that, when fully engaged, said tip ends of said first guide member are proximate said head of said second guide member and said tip ends of said second guide member are proximate said head of said first guide member;

said compression spring being slidably engageably received on said guide members extending between said shoulders and overlying said leg means;

15. Compensating apparatus as set forth in claim 14 wherein at least said head of one of said guide members and said leg means of the other of said guide members proximate said tip ends having cooperating transversely extending keyways formed therein for temporarily receiving, when mutually aligned, a mating key member to thereby maintain said spring assembly in the retracted condition with said compression spring in a compressed state and bearing against said oppositely disposed shoulders;

whereby, upon removal of the key member from the keyways, said spring assembly assumes an expanded condition under the bias of said compression spring acting against said shoulders, said head of one of said guide members being engaged with said extremity of said frame means, said head of the other of said guide members being engaged with said carrier means distant from said cam member.

16. Compensating apparatus continuously engageable with an endless belt being advanced by and supported on a pair of spaced apart sheave means which guide the belt along opposed courses, said compensating apparatus comprising:

first and second spaced apart guide members at fixed distances apart and engageable with one of the courses of the belt;

means biasing said first guide member into engagement with the belt; and means distant from said biasing means for freely supporting said second guide member to assure passive engagement of the belt by said second guide member;

said guide members being movable in unison along the belt in response to the path taken by the belt thereby maintaining substantially constant the tension in the belt regardless of the path assumed by the belt.

* * * * *